US010883746B2

(12) United States Patent
Leiper et al.

(10) Patent No.: US 10,883,746 B2
(45) Date of Patent: Jan. 5, 2021

(54) CONTROLLING HEAT EXCHANGE FROM REFRIGERATION SYSTEM TO GEOTHERMAL SYSTEM

(71) Applicant: ERDA MASTER IPCO LIMITED, Jersey (GB)

(72) Inventors: Alban Leiper, London (GB); Alex Rossi, London (GB); Nicholas Rivers, Kent (GB); Dmitriy Zaynulin, London (GB)

( * ) Notice: Subject to any disclaimer, the term of this patent is extended or adjusted under 35 U.S.C. 154(b) by 507 days.

(21) Appl. No.: 15/104,633

(22) PCT Filed: Dec. 17, 2014

(86) PCT No.: PCT/EP2014/078333
§ 371 (c)(1),
(2) Date: Jun. 15, 2016

(87) PCT Pub. No.: WO2015/091711
PCT Pub. Date: Jun. 25, 2015

(65) Prior Publication Data
US 2016/0320097 A1 Nov. 3, 2016

(30) Foreign Application Priority Data

Dec. 17, 2013 (GB) .................................. 1322319.3

(51) Int. Cl.
*F25B 6/04* (2006.01)
*F25B 9/00* (2006.01)
(Continued)

(52) U.S. Cl.
CPC .................. *F25B 6/04* (2013.01); *F25B 6/00* (2013.01); *F25B 9/00* (2013.01); *F25B 9/008* (2013.01);
(Continued)

(58) Field of Classification Search
CPC ...... F25B 6/04; F25B 6/00; F25B 9/00; F25B 9/008; F25B 25/005; F25B 27/00;
(Continued)

(56) References Cited

U.S. PATENT DOCUMENTS 4,091,636 A 5/1978 Margen
5,157,931 A * 10/1992 Alsenz ...................... F25B 1/00
62/116
(Continued)

FOREIGN PATENT DOCUMENTS

GB 2488797 A 12/2012
JP 2006125769 A 5/2006
(Continued)

OTHER PUBLICATIONS

Machine Translation of JP2006349332.*
(Continued)

*Primary Examiner* — Joseph F Trpisovsky
(74) *Attorney, Agent, or Firm* — Polsinelli, PC

(57) ABSTRACT

Apparatus including a refrigeration system, a geothermal system, and a refrigerant flow control apparatus connected between the refrigeration system and the geothermal system, wherein a first valve system is selectively actuatable to (i) in a first operation mode cause the refrigerant from a refrigerant circuit to flow through a first heat exchanger, with no refrigerant flow through a second heat exchanger, (ii) in a second operation mode cause the refrigerant from the refrigerant circuit to flow first through the first heat exchanger and then through the second heat exchanger in a first refrigerant flow direction, (iii) in a third operation mode cause the refrigerant from the refrigerant circuit to flow through the second heat exchanger, with no refrigerant flow through the first heat exchanger, and (iv) in a fourth operation mode cause the refrigerant from the refrigerant circuit to flow first (Continued)

through the second heat exchanger and then through the first heat exchanger in a second refrigerant flow direction.

11 Claims, 2 Drawing Sheets

(51) Int. Cl.
    *F25B 25/00*     (2006.01)
    *F25B 27/00*     (2006.01)
    *F25B 41/04*     (2006.01)
    *F25B 49/02*     (2006.01)
    *F25B 30/02*     (2006.01)
    *F25B 6/00*     (2006.01)
    *F24F 5/00*     (2006.01)

(52) U.S. Cl.
    CPC ............ *F25B 25/005* (2013.01); *F25B 27/00* (2013.01); *F25B 30/02* (2013.01); *F25B 41/04* (2013.01); *F25B 49/02* (2013.01); *F24F 2005/0057* (2013.01); *F25B 2600/111* (2013.01); *F25B 2700/21152* (2013.01); *F25B 2700/21161* (2013.01); *F25B 2700/21163* (2013.01); *Y02B 10/40* (2013.01); *Y02B 30/70* (2013.01)

(58) Field of Classification Search
    CPC .......... F25B 30/02; F25B 41/04; F25B 49/02; F25B 2600/111; F25B 2700/21152; F25B 2700/21162; Y02B 10/40; Y02B 30/743
    USPC ........................................................... 62/89
    See application file for complete search history.

(56) References Cited

U.S. PATENT DOCUMENTS

| | | | |
|---|---|---|---|
| 8,726,682 B1 * | 5/2014 | Olson | F25B 30/00 62/260 |
| 2002/0174673 A1 | 11/2002 | Wilkinson | |
| 2010/0108290 A1 | 5/2010 | Maxwell | |
| 2011/0042057 A1 * | 2/2011 | Li | F24F 5/0046 165/253 |
| 2011/0083454 A1 * | 4/2011 | Kopko | F25B 49/027 62/115 |
| 2013/0081781 A1 | 4/2013 | Chainer et al. | |
| 2014/0150475 A1 * | 6/2014 | Zaynulin | F25B 6/04 62/79 |

FOREIGN PATENT DOCUMENTS

| | | |
|---|---|---|
| JP | 2006349332 A | 12/2006 |
| JP | 2008275214 A | 11/2008 |
| WO | 2013074853 A1 | 5/2013 |

OTHER PUBLICATIONS

Int'l. Preliminary Report on Patentability dated Jun. 21, 2016 in corresponding Int'l. Appl'n. No. PCT/EP2014/078333.
Int'l. Search Report and Written Opinion dated Mar. 30, 2015 in corresponding Int'l. Appl'n. No. PCT/EP2014/078333.
Combined Search and Examination Report dated Sep. 8, 2014 in corresponding Appl'n. No. GB1322319.3.

\* cited by examiner

US 10,883,746 B2

CONTROLLING HEAT EXCHANGE FROM REFRIGERATION SYSTEM TO GEOTHERMAL SYSTEM

FIELD OF THE INVENTION

The present invention relates to an apparatus connected between a refrigeration system and a geothermal system and to a method of controlling heat exchange from a refrigeration system to a geothermal system. The present invention has particular application to such a refrigeration system in an industrial or commercial building, for example a supermarket.

BACKGROUND

Some buildings, such as supermarkets, incorporate large industrial scale refrigeration systems which incorporate condensers which require constant sink for rejection of the heat. Many of these systems require constant thermometric control to ensure efficient operation. Inefficient operation can result in significant additional operating costs, particularly with increasing energy costs.

It is known to use a ground coupled heat pump system to receive and store thermal energy from a refrigeration system, which energy can later be used to provide heating energy to a building having a heating demand.

The efficiency of a geothermal heat capture and storage system for capturing excess heat from a refrigeration system can sometimes be rather low, particularly when the refrigeration system needs to be operated efficiently and to have a high coefficient of performance (COP).

There is a need in the art for an apparatus connected between a refrigeration system and a geothermal system which at least partially can overcome these problems of known systems.

The present invention aims to meet these needs.

SUMMARY OF THE INVENTION

The present invention provides an apparatus connected to a refrigeration system and a geothermal system, the apparatus comprising:

a first refrigerant connection connecting a compressor discharge line of a refrigerant circuit of a refrigeration system to a first side of a first heat exchanger, the first side of the first heat exchanger being couplable to the refrigerant and a second side of the first heat exchanger being couplable to ambient air, a second refrigerant connection connecting the first side of the first heat exchanger to a first side of a second heat exchanger, a second side of the second heat exchanger being couplable to a working fluid in a geothermal system, a third refrigerant connection connecting the first side of the second heat exchanger to a liquid return line of the refrigeration circuit, a first refrigerant interconnection that interconnects the first refrigerant connection with the second refrigerant connection, a second refrigerant interconnection that interconnects the second refrigerant connection with the third refrigerant connection, a third refrigerant interconnection that interconnects the first refrigerant connection with the third refrigerant connection, a first valve system for diverting the flow of refrigerant through preselected paths in the connections and interconnections, a second valve system for controlling the amount of working fluid flowing through the second side of the second heat exchanger, a fan for controlling the amount of air flow through the second side of the first heat exchanger, and a control system, connected to the first and second valve systems and the fan, for controlling for valve positions in the first and second valve systems and fan speed.

The present invention further provides method of operating a refrigeration system, the method comprising the steps of:

(a) providing a first heat exchanger having a first side and a second side, the first side of the first heat exchanger being coupled to a refrigerant circuit of the refrigeration system and a second side of the first heat exchanger being coupled to ambient air, the first heat exchanger having a fan for controlling air flow through the first heat exchanger, (b) providing a second heat exchanger having a first side and a second side, the first side of the second heat exchanger being coupled to the refrigerant circuit of the refrigeration system and the second side of the second heat exchanger being coupled to a geothermal system in which a working fluid is, in use, circulated, (c) providing a first valve system between the refrigeration system and the first and second heat exchangers, and (d) selectively actuating the first valve system to control refrigerant flow from the refrigerant circuit to the first and second heat exchangers, and selectively controlling a speed of the fan to control a transfer of thermal energy to at least one of ambient air from the first heat exchanger and the geothermal system from the second heat exchanger.

Preferred features of the apparatus and method of the present invention are defined in the respective dependent claims.

BRIEF DESCRIPTION OF THE DRAWINGS

Embodiments of the present invention will now be described by way of example only, with reference to the accompanying drawings, in which.

DETAILED DESCRIPTION

The preferred embodiments of the present invention concern apparatus for interface between a refrigeration system in a building and a geothermal system, the refrigeration system having a demand for cooling and the geothermal system functioning as a heat sink, and the geothermal system being configured to be able to supply useful heat to the building upon any subsequent thermal demand from the building. Such refrigeration and geothermal systems require very careful and constant thermometric control to ensure efficient operation. The preferred embodiments of present invention can provide such a control by interfacing a specifically constructed refrigerant flow control apparatus between the refrigeration system and a geothermal system, with the apparatus additionally providing a further heat exchange system coupled to ambient air as an alternative heat sink to the geothermal system. The apparatus enables a controlled selection between the two potential heat sinks of the geothermal system and the further heat exchange system coupled to ambient air to enhance the operational efficiency of the composite thermal system of the refrigeration system and the geothermal system. The two potential heat sinks of the geothermal system and the further heat exchange system coupled to ambient air may be selected based upon the thermal energy requirements of the geothermal system and/or the relative temperature difference between the geothermal system and ambient air.

Figure 1:
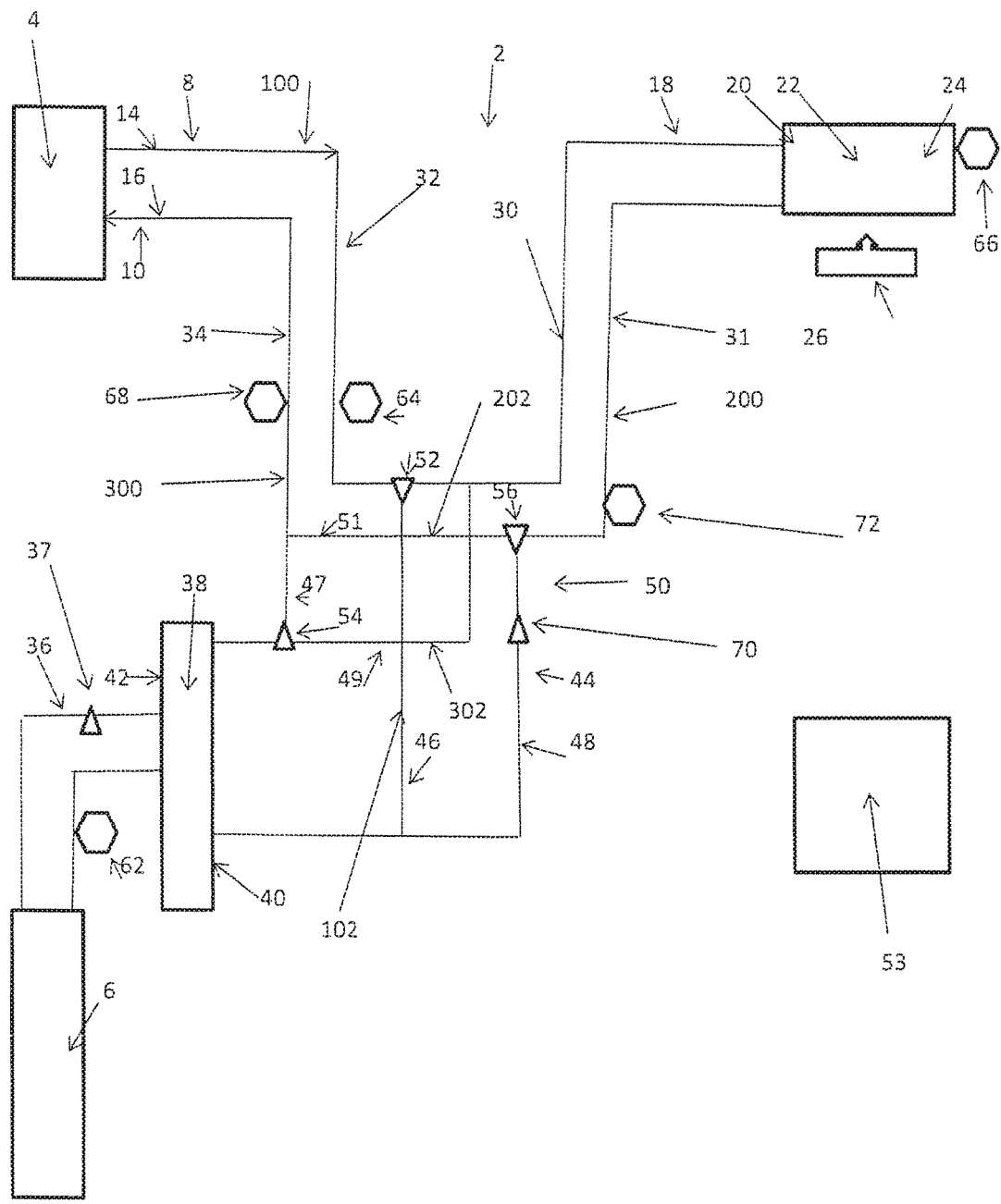
FIG. 1 is a schematic diagram of an apparatus connected between a refrigeration system and a geothermal system in accordance with an embodiment of the present invention.

Referring to FIG. 1, there is shown schematically an apparatus 2 connected between a refrigeration system 4 and a geothermal system 6.

The geothermal system 6 comprises a borehole heat exchanger system which is located substantially beneath ground level. The borehole heat exchanger system comprises any suitable borehole heat exchanger which is capable of extracting thermal energy from the ground when operated in an extraction mode as a heat source, and, conversely, when selectively operated in a replenishment mode as a heat sink, replenishing thermal energy back into the ground. Typically the first borehole heat exchanger system comprises one or more coaxial borehole heat exchangers, for example as disclosed in the Applicant's earlier patent specifications published as GB-A-2450754 or GB-A-2450755. However, any suitable borehole heat exchanger structure or assembly may be employed.

The geothermal system 6 typically comprises a borehole heat exchanger system which includes a pump (not shown) for pumping working fluid, typically an aqueous fluid including an alkylene glycol such as ethylene glycol, around a loop including the borehole heat exchanger system.

The apparatus 2 comprises a first fluid conduit 8 connecting the apparatus 2 to a refrigerant circuit 10 of the refrigeration system 4. The refrigerant circuit 10 includes a compressor discharge line 14, along which a compressed refrigerant vapour, such as carbon dioxide, is conveyed from the refrigeration system 4 to the first conduit 8, and a return line 16, along which the condensed liquid refrigerant, such as liquid carbon dioxide, is returned to the refrigeration system 4.

Although not illustrated, as known to those skilled in the art, the refrigerant circuit 10 may comprise expansion and condensation valves at appropriate locations, together with pressure sensors located at appropriate locations, in the refrigerant circuit 10 to ensure that the phase balance and the heat balance in the apparatus 2 function efficiently with the heat exchangers as hereinafter described.

A second conduit 18 connects the apparatus 2 to a first side 20 of a first heat exchanger 22, which first side 20 is, in use, coupled to the refrigerant. A second side 24 of the first heat exchanger 22 is, in use, coupled to ambient air. A fan 26 in the first heat exchanger 22 controls air flow through the first heat exchanger 22, and consequently the level of heat transfer from the first side 20 to the second side 24 and hence to the ambient atmosphere. The fan 26 incorporates an electrical motor (not shown) to drive the fan 26 at the desired speed to achieve a desired air flow over the first heat exchanger 22, and therefore a desired variable heat sink functionality.

The first heat exchanger 22 may be any suitably constructed heat exchanger adapted to be coupled on one side to a liquid supply and on the other side to ambient air. A single heat exchanger may be provided, or alternatively a plurality of heat exchangers in any suitable array, for example arranged in parallel with respect to the refrigerant flow.

A first fluid line 30 interconnects the first and second conduits 8, 18. The first fluid line 30 is adapted to permit flow of refrigerant between the first and second conduits 8, 18. The first fluid line 30 comprises a compressor discharge conduit 32, connected to the compressor discharge line 14. A liquid return conduit 34 is connected to the liquid return line 16.

The apparatus 2 includes a second heat exchanger 38 having a first side 40 and a second side 42. The second heat exchanger 38 is arranged to provide heat exchange between the refrigerant circuit 10 and the geothermal system 6.

A third fluid conduit 36 connects the second side of the second heat exchanger 38 to the geothermal system 6 in which a working fluid, such as an aqueous solution of ethylene glycol, is, in use, circulated. The third conduit 36 includes a modulating valve 37, comprising a second valve system, which selectively regulates, i.e. variably controls, the flow rate of the working fluid of the geothermal system 6.

The second heat exchanger 38 may be any suitably constructed heat exchanger adapted to be coupled on opposite sides to respective liquid supplies. For example, a plate heat exchanger may be employed. A single heat exchanger may be provided, or alternatively a plurality of heat exchangers in any suitable array, for example arranged in parallel with respect to the refrigerant flow.

A second fluid line 44 for refrigerant is connected between the first side 40 of the second heat exchanger 38 and the first side 20 of the first heat exchanger 22. The second line 44 is adapted to permit flow of refrigerant between the first side 40 of the second heat exchanger 38 and the side 20 of the first heat exchanger 22. The second side 42 of the second heat exchanger 38 is connected to the third conduit 36. Therefore the second heat exchanger 38 is arranged to provide heat exchange between the refrigerant circuit 10 and the geothermal system 6.

A first diverter valve system 50 is connected within the connections and interconnections between the refrigerant system 4 and the first and second heat exchangers 22, 3844. The first diverter valve system 50 is selectively actuatable to control refrigerant flow through the apparatus 2 from the refrigeration system 4 selectively to the first and second heat exchangers 22, 38, either individually or serially in either order, and thereby dynamically to control the selection of the heat sink or heat sinks, i.e. the geothermal system 6 and/or ambient air, depending upon control parameters.

The second line 44 comprises a first spur 46 connected by a first three-way diverter valve 52 between the compressor discharge conduit 32 and the first side 40 of the second heat exchanger 38, a second spur 47 connected by a second three-way diverter valve 54 between the first side 40 of the second heat exchanger 38 and the return conduit 34, a third spur 48 connected by a third three-way diverter valve 56 between the return conduit 34 and the first spur 46, and a fourth spur 49 connected between second three-way diverter valve 54 on the second spur 47 and the compressor discharge conduit 32.

The first, second and third three-way diverter valves 52, 54, 56 can be configured to (i) close the first, second, third and fourth spurs 46, 47, 48, 49 of the second line 44 so that all of the refrigerant from the refrigerant circuit 10 flows to the first heat exchanger 22 and not through the second heat exchanger 38, (ii) close the first and fourth spurs 46, 49 and open the second and third spurs 47, 48 of the second line 44 so that the refrigerant from the refrigerant circuit 10 flows first to the first heat exchanger 22 and then to the second heat exchanger 38 in a first refrigerant flow direction, (iii) open the first and fourth spurs 46, 49 and close the second and third spurs 47, 48 of the second line 44 so that the refrigerant from the refrigerant circuit 10 flows first to the second heat exchanger 38 and then to the first heat exchanger 22 in a second refrigerant flow direction, or (iv) open the first and second spurs 46, 47 and close the third and fourth spurs 48, 49 of the second line 44 so that all of the refrigerant from the refrigerant circuit 10 flows to the second heat exchanger 38 and not through the first heat exchanger 22.

In the illustrated embodiment, the three-way diverter valves 52, 54 and 56 divert the direction of flow of the refrigerant and do not act to regulate the rate of flow of the refrigerant.

In this specification it is described that the first, second and third three-way diverter valves 52, 54, 56 each have two positions, and this means that the valve position is selected to provide the desired flow direction.

Accordingly, there is provided a first refrigerant connection 100, via conduit 8, conduit 32, diverter valve 52, line 30, conduit 18, connecting the compressor discharge line 14 of the refrigerant circuit 10 of the refrigeration system 4 to the first side 20 of the first heat exchanger 22. There is also provided a second refrigerant connection 200, via line 31, valve 56, optional expansion valve 70, line 44, spur 48, connecting the first side 20 of the first heat exchanger 22 to the first side 40 of the second heat exchanger 38. There is also provided a third refrigerant connection 300, via valve 54, spur 47, conduit 34, connecting the first side 40 of the second heat exchanger 38 to the liquid return line 16 of the refrigeration circuit 10.

Furthermore, there is provided a first refrigerant interconnection 102, via spur 46, that interconnects the first refrigerant connection 100 with the second refrigerant connection 200. There is also provided a second refrigerant interconnection 202, via spur 51, that interconnects the second refrigerant connection 200 with the third refrigerant connection 300. There is also provided a third refrigerant interconnection 302, via spur 49, that interconnects the first refrigerant connection 100 with the third refrigerant connection 300.

A control system 53 is provided for controlling the three-way diverter valves of the first valve system 50, the modulating valve 37 of the second valve system, and a speed of the fan 26.

For clarity of illustration the electrical, network or wireless connections between the control system 53 and the various components, not only the controlled elements, such as the valves and the fan, but also sensors, such as temperature sensors, providing input variables, are not illustrated but their arrangement will be readily apparent to those skilled in the art.

A first temperature sensor 62 is provided for sensing a first temperature associated with the working fluid of the geothermal system 6. The control system 53 is adapted to control the first valve system 50, the second valve system 37 and the speed of the fan 26 so as to maintain the temperature associated with the working fluid of the geothermal system 6 above a preset minimum value.

A second temperature sensor 64 is provided for sensing a second temperature associated with the refrigerant of the refrigerant circuit 10, and is located on the compressor discharge conduit 32.

A third temperature sensor 66 is provided for sensing a third temperature associated with ambient air in the vicinity of the first heat exchanger 22. The control system 53 is adapted to control the first valve system 50 and the speed of the fan 26 so as to optimise the coefficient of performance of the refrigerant circuit 10. The apparatus 2 is operated to maintain a relatively low refrigerant temperature in the refrigerant circuit 10.

A fourth temperature sensor 68 is provided for sensing a fourth temperature associated with the refrigerant in the return conduit 34 of the refrigerant circuit 10.

An expansion valve 70 may be optionally provided between the first and second heat exchangers 22, 38 which is controlled by a fifth temperature sensor 72. The expansion valve 70 is provided to optimize the refrigerant pressure to provide, in a manner known to those skilled in the art, that the first heat exchanger 22 can act as an air-condenser/air gas cooler with a maximum ability to discharge energy, and the expansion valve also reduces refrigerant pressure entering the second heat exchanger 38 to permit condensing of refrigerant in the second heat exchanger 38. Such a refrigerant phase control arrangement ensures an energy balance between energy discharged at the first heat exchanger 22 and energy discharged at the second heat exchanger 38.

The control system 53 is adapted to control the fan speed in the first heat exchanger 22 based on the fifth temperature sensor 72 in order to optimize the efficiency of the first heat exchanger 22.

The control system 53 is adapted to control the diverter valve system 50 in a selected refrigerant flow mode, to control the fan speed in the first heat exchanger 22 and also to control the modulating valve 37 in the third conduit 36 to control the rate of flow of working fluid in the geothermal system, and therefore the rate of heat energy take-up by the geothermal system 6 from the apparatus 2.

In a first refrigerant flow mode, the second line 44 is closed and the first line 30 is open. All of the refrigerant flow is through the first heat exchanger 22. This mode is the default safety mode.

The control system 53 is also preferably adapted to control the diverter valve system 50 and the speed of the fan 26 so as in a safety mode to close the second line 44 and maintain a speed of the fan 26 above a preset minimum value. The safety mode can be effected by the first refrigerant flow mode. This ensures that the refrigerant flow passes to the first heat exchanger 22 which has a high air flow rate therethrough as a result of a high fan speed.

In a second refrigerant flow mode, both the first line 30 and the second line 44 are open and the refrigerant on the compressor discharge conduit 32 flows initially through the first heat exchanger 22 and subsequently through the second heat exchanger 38.

In a third refrigerant flow mode, the first line 30 is closed and the second line 44 is open. All of the refrigerant flow is through the second heat exchanger 38.

In a fourth refrigerant flow mode, both the first line 30 and the second line 44 are open and the refrigerant on the compressor discharge conduit 32 flows initially through the second heat exchanger 38 and subsequently through the first heat exchanger 22.

In the second refrigerant flow mode, the control system 53 may be adapted to control, by controlling the modulating valve 37, a flow rate of the working fluid of the geothermal system 6 through the second heat exchanger 38 according to a preset relationship. In the second refrigerant flow mode the control system 53 is adapted, in response to the temperature 62 of the fluid in conduit 36 reading below a first preselected value, indicating a thermal demand of the geothermal system, linearly to increase the working fluid flow rate through the second side 42 of the second heat exchanger 38 within a range extending between a zero or low flow rate in the first refrigerant flow mode and a high flow rate in the third and fourth refrigerant flow modes.

In the second refrigerant flow mode the control system 53 is adapted to control the speed of the fan 26 in a selected fan speed mode together with the selected refrigerant flow mode. In response to the temperature 62 of the fluid in conduit 36 reading below a second preselected value, the speed of the fan 26 is decreased linearly from a high air flow rate state to a zero or relatively low air flow rate state. The fan speed is based on the fifth temperature reading 72 and aims to maintain this temperature as close to the third temperature 66, as such optimizing the efficiency of the second heat exchanger 22, and subsequently the coefficient of performance of the refrigeration circuit 10. When the fluid flow rate through the second side 42 of the second heat exchanger 38 is in a high flow rate state, and the air flow rate through the second side 24 of the first heat exchanger 22 is in a zero or low flow rate state and the temperature 62 of the fluid in conduit 36 is below a third preselected value, the control system 53 is adapted to control the diverter valve system 50 to either the third or fourth refrigerant flow mode. The third or fourth refrigerant flow mode is selected based on the temperature readings 62 and 66 in order to optimize the COP of the refrigerant circuit 10.

The operation of the apparatus 2 will now be described with additional reference to FIG. 2.

The control system 53 is adapted to control the diverter valve system 50 and the speed of the fan 26 in a selected one of at least four heat control modes. These modes are controlled in response to inputs from the first, second, third and fourth temperature sensors 62, 64, 66 and 68. The fifth temperature sensor 72 also provides an input to the control system 53 to control the expansion valve 70.

The default safety valve position of the diverting valve system 50 is where the second line 44 is closed and the first line 30 is open. This diverts refrigerant flow to the first heat exchanger 22 and prevents refrigerant flow to the second heat exchanger 38. The fan speed is set to a predetermined, fixed state of relatively high air flow rate. This mode is only used in the event of a fault, for example in the event of an absence of correct signals from the various temperature and pressure sensors in the refrigerant circuit.

When the system is healthy and the first temperature 62 associated with the working fluid of the geothermal system 6 is above a preset minimum value, no thermal demand is made by the geothermal system 6 and the temperature is sufficiently high to maintain the thermal efficiency of the geothermal system 6 and the associated second heat exchanger 38. Accordingly, in a first heat control mode, indicated as I in FIG. 2, the working fluid flow rate in the third fluid conduit 36 of the geothermal system 6 is controlled by the modulating valve 37 to be at a minimum (which may be zero). In the first heat control mode I the fan speed is at a relatively high air flow rate to maximise heat exchange to ambient air at the first heat exchanger 22. In the first heat control mode I, the second refrigerant flow mode is active, where both the first line 30 and the second line 44 are open and the refrigerant on the compressor discharge conduit 32 flows initially through the first heat exchanger 22 and subsequently through the second heat exchanger 38. In the first heat control mode, substantially all heat rejected from the refrigerant circuit 10 and entering the apparatus 2 at the first conduit 8 is expelled to air by the first heat exchanger 22.

When the first temperature associated with the working fluid of the geothermal system 6 reaches or falls below the first prescribed threshold value, the system enters the second heat control mode II and an additional thermal demand is made by the geothermal system 6. When there is a thermal demand, the control system 53 maintains the diverter valve system 50 to select the second refrigerant flow mode where the compressor discharge flows initially through the first heat exchanger 22 and subsequently through the second heat exchanger 38.

Initially, this thermal demand may be met by increasing the flow rate of working fluid in the third fluid conduit 36 of the geothermal system 6 through the second side of 42 of the second heat exchanger 38, with appropriate control, for example linearly, of the modulating valve 37 by the control system 53 to be at a position between the minimum value (which may be zero) and a maximum value. In this mode the apparatus is modified so as to function in a way that partially recovers heat from the refrigerant. A decreased proportion of the excess heat from the refrigerant circuit 10 is expelled to ambient air by the first heat exchanger 22 and an increased proportion of the excess heat from the refrigerant circuit 10 is rejected via the second heat exchanger 38 into the working fluid of the geothermal system 6. In the second heat control mode II the fan 26 is maintained in a state of relatively high air flow rate.

The second heat control mode is a normal operating mode for the majority of geothermal and ambient conditions. A majority of the heat extracted from the refrigerant circuit 10 and entering the apparatus 2 at the first connection 8 is expelled to air by the first heat exchanger 22 and a minority of the heat extracted from the refrigerant circuit 10 and entering the apparatus 2 at the first connection 8 is expelled to the geothermal system 6 by the second heat exchanger 38. The three-way diverter valve 52 directs refrigerant from the compressor discharge conduit 32 to the first side 20 of the first heat exchanger 22. The refrigerant passes through the first side 20 of the first heat exchanger 22 and then to the first side 40 of the second heat exchanger 38 via the three-way valve 58. The refrigerant passes through the first side 40 of the second heat exchanger 38 and then to the return conduit 34 via the three-way valve 54.

As the thermal demand from the geothermal system 6 increases, the working fluid flow through the second heat exchanger 38 increases, typically linearly with increased thermal demand, which may be represented by a falling temperature of the working fluid as measured by the first temperature sensor 62. The working fluid flow through the second heat exchanger 38 may reach a maximum value in this second heat control mode.

If the thermal demand of the geothermal system 6 continues to increase and the flow rate of working fluid through the second heat exchanger 38 is already at a maximum, the third heat control mode III is selected. By decreasing the fan speed, a decreased proportion of the heat rejected from the refrigerant circuit 10 is expelled to ambient air by the first heat exchanger 22. Correspondingly, an increased proportion of the excess heat from the refrigerant circuit 10 is rejected via the second heat exchanger 38 into the working fluid of the geothermal system 6. This enables a greater amount of heat to be recovered into the geothermal system from the refrigerant, in order to increase the temperature of the working fluid of the geothermal system 6. The fan speed is based on the fifth temperature reading 72 and aims to maintain this temperature as close to the third temperature 66, as such optimizing the efficiency of the second heat exchanger 22, and subsequently the coefficient of performance of the refrigeration circuit 10.

Figure 2:
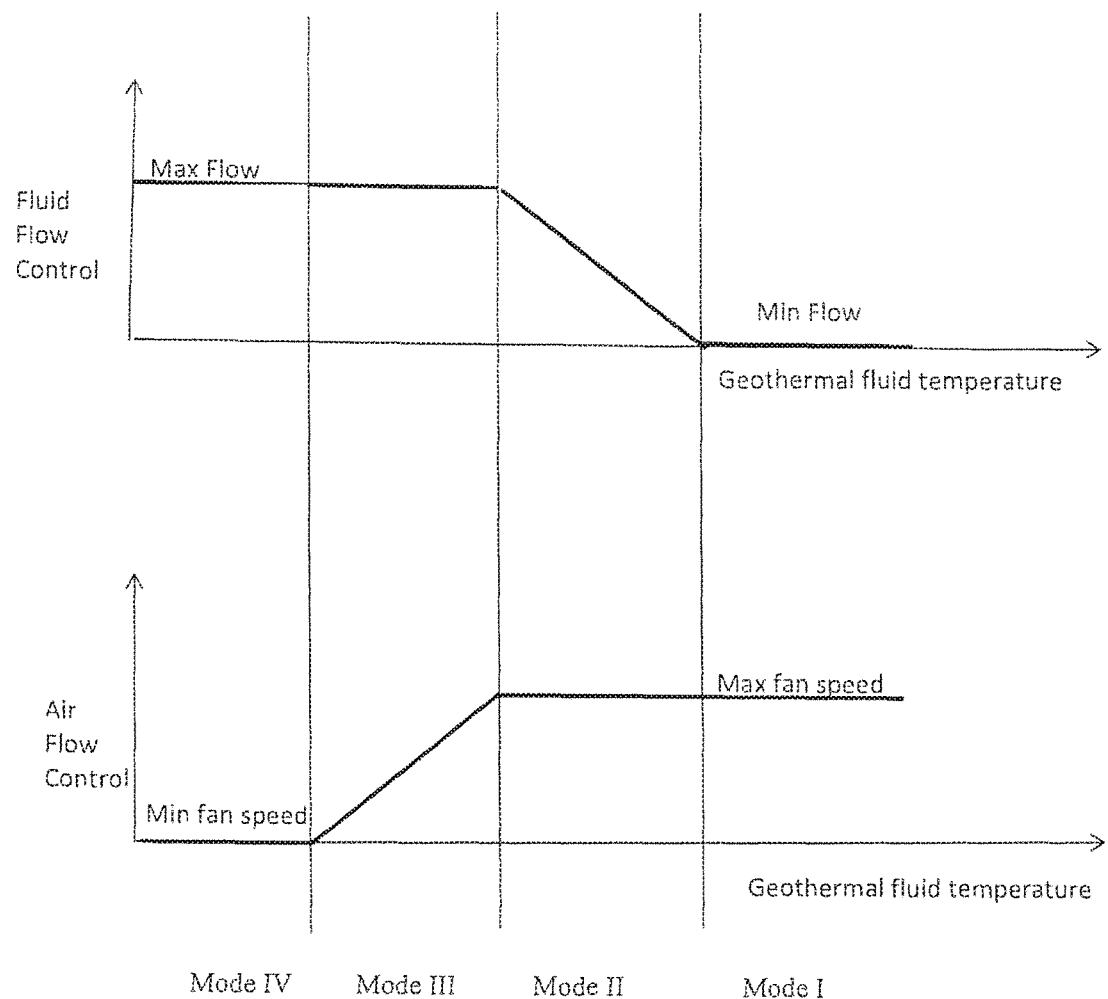
FIG. 2 is a schematic diagram showing four modes of operation of the apparatus of FIG. 1.

Accordingly, in a third heat control mode, indicated as III in FIG. 2, the working fluid flow rate in the third fluid conduit 36 of the geothermal system 6 is controlled by the modulating valve 37 to be at the maximum value. The second line 44 is opened, and the fan speed is at a lower air flow rate as compared to the second heat control mode. The result is that a minority of the heat extracted from the refrigerant circuit 10 and entering the apparatus 2 at the first conduit 8 is expelled to air by the first heat exchanger 22 and a majority of the heat extracted from the refrigerant circuit 10 and entering the apparatus 2 at the first conduit 8 is expelled to the geothermal system 6 by the second heat exchanger 38.

The three-way valve system 50 is maintained in the same state as in heat control modes I and II whereby the three-way diverter valve 52 directs refrigerant from the compressor discharge conduit 32 to the first side 20 of the first heat exchanger 22. The refrigerant passes through the first side 20 of the first heat exchanger 22 and then to the first side 40 of the second heat exchanger 38 via the three-way valve 58. The refrigerant passes through the first side 40 of the second heat exchanger 38 and then to the return conduit 34 via the three-way valve 54.

The third heat control mode III is a warming mode for the geothermal system 6. As the thermal demand from the geothermal system 6 increases, the fan speed of the first heat exchanger 22 decreases, typically linearly with increased thermal demand of the geothermal system 6, until the fan speed may reach a minimum value in this third heat control mode.

If the temperature 62 falls below the third preselected threshold value, the fourth heat control mode IV is initiated. This mode is the maximum heat recovery mode for the geothermal system 6. The working fluid flow rate in the third fluid conduit 36 of the geothermal system 6 is maintained at a maximum, and the speed of the fan 26 is maintained in a relatively low or zero flow rate state. In this mode, either the third or fourth refrigerant flow mode is selected, with the mode chosen in order to optimize the coefficient of performance of the refrigeration circuit 10.

If the ambient temperature 66 is above the working fluid temperature 62, then there is no benefit to the refrigeration circuit 10 by passing refrigerant through the first heat exchanger 22. In this case the third refrigerant flow mode is selected. The three-way diverter valve 52 directs refrigerant from the compressor discharge conduit 32 to the first side 40 of the second heat exchanger 38. The refrigerant passes through the first side 40 of the second heat exchanger 38 and then to the return conduit 34 via the three-way diverter valve 56. The three-way diverter valve 58 is closed at the junction to the return conduit 34 or connects the return conduit 34 back to the first side 40 of the second heat exchanger 38.

In the fourth heat control mode IV with the third refrigerant flow mode selected, all of the refrigerant flow is through the second heat exchanger 38, the fluid flow rate through the fluid conduit 36 is at a maximum and the speed of the fan 26 is at a minimum. This provides that all heat extracted from the refrigerant circuit 10 and entering the apparatus 2 at the first conduit 8 is rejected to the geothermal system 6 by the second heat exchanger 38.

If the ambient temperature 66 is below the working fluid temperature 62 plus a prescribed temperature difference, for example 2° C., then improvements can be made to the coefficient of performance of the refrigeration circuit 10 if the fourth refrigerant flow mode is selected.

In the fourth heat control mode IV with the fourth refrigerant flow mode selected, the refrigerant flow is through the second heat exchanger 38 first and then the first heat exchanger 22, the working fluid flow rate in the third fluid conduit 36 of the geothermal system 6 is controlled by the modulating valve 37 to be at the maximum value and the speed of the fan 26 is at a zero or relatively low flow rate state. This provides that most of the heat extracted from the refrigerant circuit 10 and entering the apparatus 2 at the first conduit 8 is rejected to the geothermal system 6 by the second heat exchanger 38. The rest of the heat is rejected to ambient air by the first heat exchanger 22 and as the ambient temperature is below that of the working fluid in the geothermal system 6, improvements to the performance of the refrigeration circuit 10 are realised.

In this case valve 52 directs refrigerant from the compressor discharge conduit 32 to the first side 40 of the second heat exchanger 38. The refrigerant passes through the first side 40 of the second heat exchanger 38 and then to the first side 20 of the first heat exchanger 22 via the three-way valve 56. The refrigerant passes through the first side 20 of the first heat exchanger 22 and then to the return conduit 34 via the three-way valve 58.

The fourth heat control mode is a full heating mode for the geothermal system.

The control system 53 may switch back from the various heat control modes after minimum operating periods and/or in response to modified temperature parameters, for example when the working fluid temperature in the geothermal system has increased above a preset minimum threshold.

For example, the control system 53 may switch back from the third heat control mode to the second heat control mode, or from the fourth heat control mode to the second heat control mode via the third heat control mode, for a given period of time.

The preferred embodiments of the present invention can provide that the apparatus controls the energy input into the geothermal system from the refrigerant circuit so as to optimise energy transfer to ensure efficient operation of the refrigeration system and manage the temperature of the geothermal system. The apparatus can achieve a control of the minimum condensing pressure of the refrigerant so as to maintain the refrigeration efficiency. The controlling of the refrigerant heat exchange and the fan speed can control the set point, i.e. the temperature on the condensing side of the refrigerant circuit to ensure refrigeration efficiency. The apparatus can also control the flow rate of the working fluid in the geothermal system which manages energy input into the geothermal system from the refrigerant circuit.

The apparatus may operate according to an algorithm representing one of plural thermal demands of the geothermal system.

A first thermal demand may represent a summer demand. The geothermal system is employed to remove heat from the refrigerant to assist refrigerant condensation.

A second thermal demand may represent a winter demand. The geothermal system is employed to reclaim more heat from the refrigerant into the geothermal system, the reclaimed heat being used subsequently to provide a positive energy supply to, for example, a heating, ventilating and air conditioning (HVAC) system.

The embodiments of the present invention described herein are purely illustrative and do not limit the scope of the claims. For example, the diverter valves may be substituted by alternative fluid switching devices; and alternative modes of operation may be determined based on the particular characteristics of various alternative geothermal systems, borehole heat exchangers, ambient air heat exchangers, and/or refrigeration systems.

Yet further, in additional embodiments of the invention, as modifications of the illustrated embodiments, the first borehole heat exchanger system comprises one or a plurality of first heat exchangers and/or the second borehole heat exchanger system comprises one or a plurality of second heat exchangers.

Various other modifications to the present invention will be readily apparent to those skilled in the art.

The invention claimed is:

1. An apparatus comprising a refrigeration system, a geothermal system, and a refrigerant flow control apparatus connected between the refrigeration system and the geothermal system, the refrigerant flow control apparatus comprising:
a first refrigerant connection connecting a compressor discharge line of a refrigerant circuit of the refrigeration system to a first side of a first heat exchanger, the first side of the first heat exchanger being couplable to the refrigerant and a second side of the first heat exchanger being couplable to ambient air,
a second refrigerant connection connecting the first side of the first heat exchanger to a first side of a second heat exchanger, a second side of the second heat exchanger being couplable to a working fluid in the geothermal system,
a third refrigerant connection connecting the first side of the second heat exchanger to a liquid return line of the refrigerant circuit,
a first refrigerant interconnection that interconnects the first refrigerant connection with the second refrigerant connection,
a second refrigerant interconnection that interconnects the second refrigerant connection with the third refrigerant connection,
a third refrigerant interconnection that interconnects the first refrigerant connection with the third refrigerant connection,
a first valve system for diverting the flow of refrigerant through preselected paths in the connections and interconnections,
a second valve system for variably controlling the flow rate of working fluid flowing through the second side of the second heat exchanger,
a fan for variably controlling the air flow rate through the second side of the first heat exchanger, and
a control system, connected to the first and second valve systems and the fan, for controlling valve positions in the first and second valve systems and fan speed;
wherein the first valve system is selectively actuatable to control refrigerant flow from the refrigerant circuit selectively to the first and second heat exchangers, either individually or serially in either order; and
wherein the first valve system is selectively actuatable to (i) in a first operation mode cause the refrigerant from the refrigerant circuit to flow through the first heat exchanger, with no refrigerant flow through the second heat exchanger, (ii) in a second operation mode cause the refrigerant from the refrigerant circuit to flow first through the first heat exchanger and then through the second heat exchanger in a first refrigerant flow direction, (iii) in a third operation mode cause the refrigerant from the refrigerant circuit to flow through the second heat exchanger, with no refrigerant flow through the first heat exchanger, and (iv) in a fourth operation mode cause the refrigerant from the refrigerant circuit to flow first through the second heat exchanger and then through the first heat exchanger in a second refrigerant flow direction.

2. An apparatus according to claim 1 wherein when the first valve system is in the second operation mode the control system is adapted to control a flow rate of the working fluid through the second heat exchanger according to a preset relationship.

3. An apparatus according to claim 2 wherein when the first valve system is in the second operation mode the control system is adapted, in response to a thermal demand of the geothermal system, linearly to increase or decrease the flow rate of the working fluid through the second heat exchanger within a range extending between a zero or relatively low flow rate and a relatively high flow rate by controlling a modulating valve in the geothermal system.

4. An apparatus according to claim 1 wherein the control system is adapted to control the speed of the fan in a selected fan speed mode.

5. An apparatus according to claim 4 wherein the control system is adapted to control the speed of the fan in a selected fan speed mode selected from (a) a first fan speed mode in which the fan speed is in a relatively high air flow rate state, (b) a second fan speed mode in which the fan speed is within a range extending between a zero or relatively low air flow rate and the relatively high air flow rate in the first fan speed mode, and (c) a third fan speed mode in which the fan speed is in a zero or relatively low air flow rate state.

6. An apparatus according to claim 5 wherein in the second fan speed mode the control system is adapted to control the speed of the fan according to a preset relationship.

7. An apparatus according to claim 1 further comprising a first temperature sensor for sensing a first temperature associated with the working fluid of the geothermal system, and the control system is adapted to control the first and second valve systems and the speed of the fan so as to maintain the first temperature associated with the working fluid of the geothermal system above a preset minimum value.

8. An apparatus according to claim 7 further comprising a second temperature sensor for sensing a second temperature associated with the refrigerant of the refrigerant circuit, and the control system is adapted to control the speed of the fan so as to maintain the second temperature to the ambient temperature, as such optimizing the efficiency of the second heat exchanger, and subsequently the coefficient of performance of the refrigerant circuit.

9. An apparatus according to claim 8 further comprising a third temperature sensor for sensing a third temperature associated with ambient air in the vicinity of the first heat exchanger, and the control system is adapted to control the first valve system and the speed of the fan so as to optimize the coefficient of performance of the refrigerant circuit.

10. An apparatus according to claim 1 wherein the control system is adapted to control the first valve system and the speed of the fan so as in a fail-safe mode to cause the refrigerant from the refrigerant circuit to flow only through the first heat exchanger, with no refrigerant flow through the second heat exchanger, and maintain a speed of the fan above a preset minimum value.

11. An apparatus according to claim 1 wherein the control system is adapted to control the first valve system and the speed of the fan in a selected one of at least four heat control modes comprising
a default safety mode in which the fan speed is at a relatively high air flow rate and all heat extracted from the refrigerant circuit is expelled to air by the first heat exchanger, and a first heat control mode in which the fan speed is at a relatively high air flow rate, the working fluid flow rate is at a relatively low or zero flow rate and a majority of the heat extracted from the refrigerant circuit is expelled to air by the first heat exchanger and a minority of the heat extracted from the refrigerant circuit is rejected to the geothermal system by the second heat exchanger, a second heat control mode in which the fan speed is at a relatively high air flow rate, the working fluid flow rate is in a range between a relatively low or zero flow rate and a high flow rate state, and the proportion of the total heat rejected by the refrigerant circuit to the geothermal system via the second heat exchanger is increased, and a third heat control mode in which the working fluid flow rate through the second heat exchanger is at a maximum and the fan speed is in a range between a relatively low or zero flow rate or high air flow rate state, and the proportion of the total heat rejected by the refrigerant circuit to the geothermal system via the second heat exchanger is further increased as compared to the second heat control mode, and a fourth heat control mode in which the fan speed is zero or at a relatively low air flow rate, the working fluid flow rate through the second heat exchanger is at a maximum and all heat extracted from the refrigerant circuit is rejected to the geothermal system by the second heat exchanger.

\* \* \* \* \*